United States Patent

[11] 3,612,425

| [72] | Inventors | Henry G. Shakespeare;<br>Gerald Dale Harrington, both of<br>Kalamazoo, Mich. |
|---|---|---|
| [21] | Appl. No. | 835,382 |
| [22] | Filed | June 23, 1969 |
| [45] | Patented | Oct. 12, 1971 |
| [73] | Assignee | Shakespeare of Arkansas, Inc.<br>Fayetteville, Ark. |

[54] BAIT-CASTING REEL
12 Claims, 8 Drawing Figs.

[52] U.S. Cl. .................................................. 242/84.1 R,
242/84.42, 242/219, 242/220
[51] Int. Cl. ........................................................ A01k 89/04
[50] Field of Search ........................................... 242/84.1,
84.44, 84.45, 84.46, 84.5, 84.51, 84.54, 84.42

[56] References Cited
UNITED STATES PATENTS

| 782,130 | 2/1905 | Hendryx | 242/84.1 |
| 869,474 | 10/1907 | Atwood | 242/84.45 |
| 940,415 | 11/1909 | Williams | 242/84.45 UX |
| 1,321,284 | 11/1919 | Carter | 242/84.1 |
| 1,398,429 | 11/1921 | Harradine | 242/84.5 |
| 1,730,332 | 10/1929 | Pflueger | 242/84.51 |
| 2,251,782 | 8/1941 | Coxe | 242/84.44 |
| 2,354,530 | 7/1944 | McMahon | 242/84.44 |
| 2,537,590 | 1/1951 | Kaufman | 242/84.1 |
| 2,614,768 | 10/1952 | Shakespeare, Jr. | 242/84.1 |

Primary Examiner—Billy S. Taylor
Attorney—Hamilton, Cook, Renner & Kenner

ABSTRACT: A bait-casting reel. The reel has a head plate and a tail assembly conjoined in spaced relation to provide an integrated, rigid frame. The tail assembly comprises a tail plate and a spider. The spider has a plurality of legs extending radially from a nave, and the legs are detachably mounted to the tail plate radially of a cylindrical access through the tail plate. An arbor is supported through the head plate, and a connecting means anchors the arbor to the nave of the spider so that the arbor can be selectively positionable axially of itself. A line spool is rotatably mounted on the arbor between the head and tail plates, and removable locating means retain the spool in fixed axial relation with respect to the arbor and permit the spool to be selectively removed from the arbor through the cylindrical access. A drive shaft, to which a crank is secured, is rotatably mounted on the arbor exteriorly of the head plate, and a drive train operatively connects the drive shaft to the line spool so that rotation of the former effects multiple revolutions of the latter. A traversing shaft is journaled between the head and tail plates in spaced relation with the line spool. A first gearing means operatively joins the traversing shaft to the drive shaft, and a second gearing means operatively joins the traversing shaft to the line spool. Both the first and second gearing means are solely supported from the rigid frame.

PATENTED OCT 12 1971 3,612,425
SHEET 1 OF 3
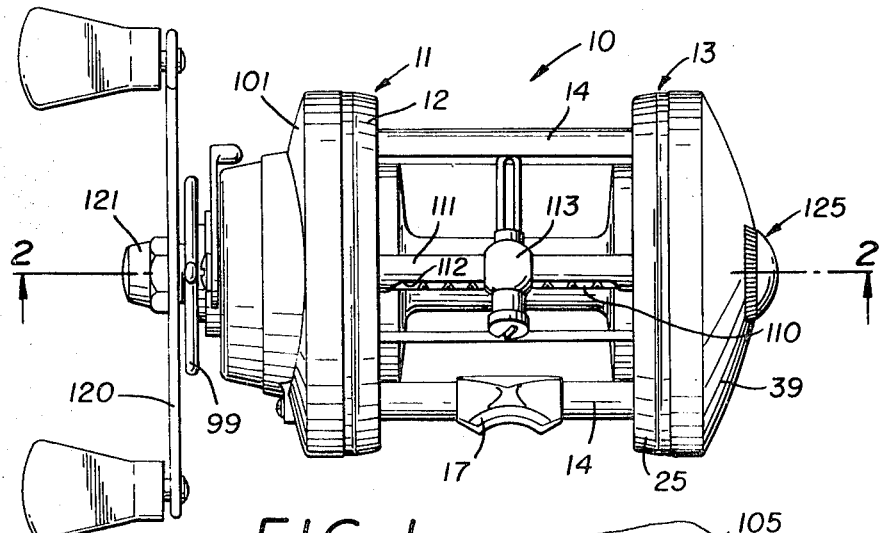
FIG. 1
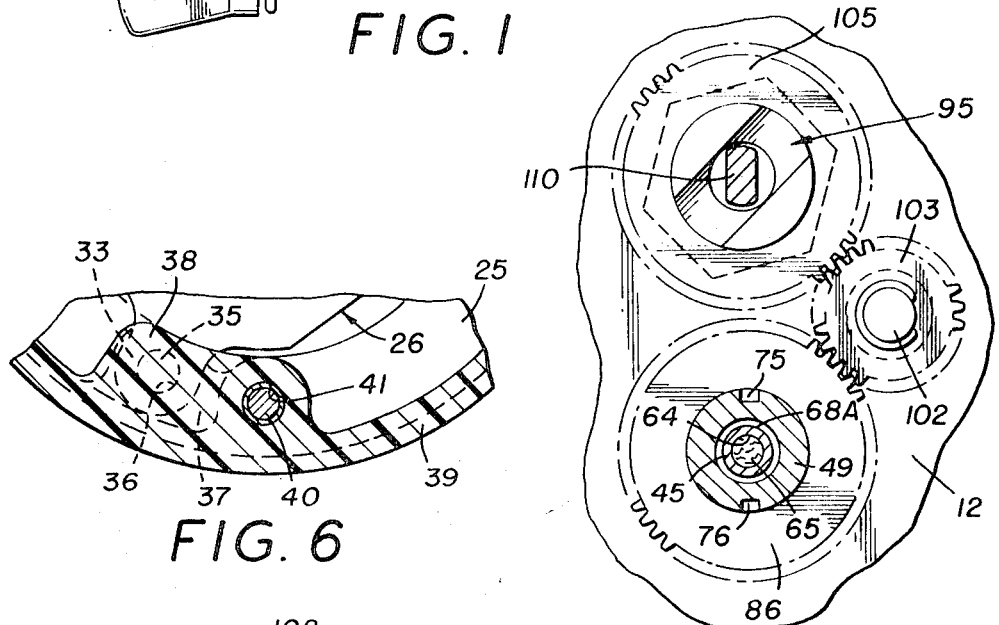
FIG. 6
FIG. 5
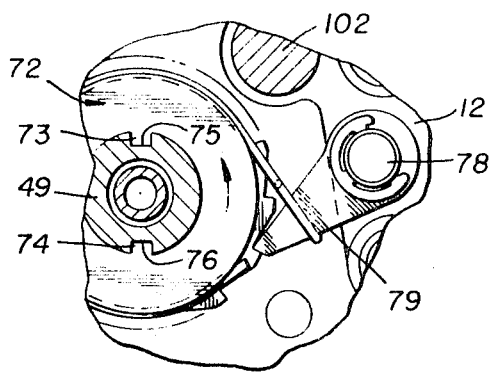
FIG. 7
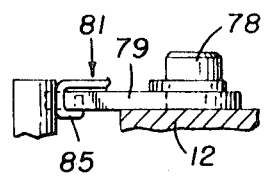
FIG. 8
INVENTORS
HENRY G. SHAKESPEARE
GERALD DALE HARRINGTON
BY Hamilton Cook
Rennert Kenner
ATTORNEYS INVENTORS
HENRY G. SHAKESPEARE
GERALD DALE HARRINGTON
BY Hamilton, Cook,
Renner & Kenner
ATTORNEYS

INVENTORS
HENRY G. SHAKESPEARE
GERALD DALE HARRINGTON
ATTORNEYS

BAIT-CASTING REEL

BACKGROUND OF THE INVENTION

The modern bait-casting reel had its genesis more than a hundred and fifty years ago when George Snyder, a Kentucky watchmaker, made the first multiplying reel. Mr. Snyder affixed his line spool to a steel shaft and conically tapered the ends thereof to points that were rotatably received in corresponding pivot, or end, caps threaded onto exterior bosses at the center of the end plates. A crank was rotatably mounted between one of the end plates and a third, or head, plate spaced inwardly of that end plate to form a gear housing therebetween. The gear train that afforded the multiplying effect by which one revolution of the crank, about an axis laterally offset from the axis of the line spool, accomplished multiple revolutions of the line spool were also journaled between the head and end plates defining the lateral walls of the gear housing.

The past century and a half have witnessed many improvements to bait-casting reels, but the basic concept has gone unchanged. As such, most modern, multiplying reels still utilize spaced walls in the head assembly from which to journal the gearing between the crank and the line spool, one end of the shaft supporting the line spool itself being journaled from the outermost wall of the head assembly. In these modern reels the bearings at the outermost wall of the head assembly may be of the jewel variety and may well be mounted within the end wall with a cap—vestigial of the original pivot—serving as an oil cup that is removable for inspection.

In any event, any lateral, as distinguished from axial, play afforded the line spool can produce disastrous results, particularly when the spool flanges contact the surrounding housing walls of the head or tail assemblies. One common cause of undesirable lateral play for the line spool may reside with worn bearings, but bearings can be replaced. A far more insidious cause of such spool play can be a lack of rigidity in the reel frame supporting the line spool.

By relying on bearings, or pivots, mounted in a plurality of spaced frame members that are detachably interconnected, the slightest play between the frame members will permit the members supported between those bearings to bind. At best, such binding will merely impair the efficiency of the reel and thus reduce the length of the cast that can be made therewith. Far worse, it can, and has, led to lost fish. When the frame of the reel lacks the desired rigidity, the reel can jam merely as a result of the force applied to the line spool laterally of its rotational axis by a fish on the end of the line. In cheaply constructed reels such a situation may be merely an incident of the reel design, but it can, as well, happen to reels of premium quality if the screws by which the frame components are assembled become the least bit loose.

In addition to frame rigidity and a minimization of the number of members required to be journaled from spaced, detachably interconnected frame members, there are several other characteristics desirable for bait casting reels. Foremost among these are the provision for a smooth cast and a smooth retrieve in a reel capable of long life under even arduous usage.

Bait casting reels are also preferably "multiplying." That is, a single revolution of the crank should impart multiple revolutions to the spool. Although the ratio of the two rotations may vary from maker to maker and be further varied for the particular type fishing with which the reel is to be used, a ratio of between 3½:1 and 4:1 is desirable for most bait-casting reels.

To these basic characteristics three additional accessories are also highly desirably: a level wind, to preclude the necessity of laying the line evenly on the spool with the forefinger and thumb while looking somewhere else; a free-spooling mechanism, to reduce the mass required to be put in motion at the beginning of the cast and, conversely, to reduce the mass that must be stopped at the end of the cast; and, an antibacklash mechanism, to assist in the reduction of the angular velocity of the spool near the end of the cast so that the spool is not turning faster than required to unwind the line being drawn therefrom by the cast.

SUMMARY OF THE INVENTION

It is, therefore, a primary object of the present invention to provide a bait-casting reel in which stability to the line spool, drive train and other rotatable components is assured through utilization of a rigid frame.

It is another object of the present invention to provide a bait-casting reel, as above, employing a novel drive train supported solely from the rigid frame.

It is a further object of the present invention to provide a bait-casting reel, as above, that is of the multiplying variety, will cast and retrieve smoothly over a long life of arduous use with minimal maintenance and is readily capable of incorporating a level wind mechanism, a free-spooling mechanism and/or an antibacklash mechanism.

It is a still further object of the present invention to provide a bait-casting reel, as above, in which line spools may be interchanged without requiring a major disassembly of the reel and be adjustably positionable with respect to the reel frame.

These and other objects, together with the advantages thereof over existing and prior art forms, which will become apparent from the following specification are accomplished by means hereinafter described and claimed.

In general, a reel embodying the concept of the present invention has an integrated frame that is comprised of a tail assembly, a head plate that is rigidly secured in spaced relation to the tail assembly and an arbor that is anchored in the tail assembly and is additionally supported through the head plate. A line spool is rotatably mounted on the arbor between the head plate and the tail assembly, and a drive shaft is rotatably mounted on that portion of the arbor extending outwardly on the head plate in a direction oppositely of the tail assembly.

A drive train operatively connects between the drive shaft and the line spool, and, to assure the desired stability of the rotating components, they are all mounted on the integrated, rigid frame.

One preferred embodiment is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 1 is a frontal elevation of a bait casting reel embodying the concept of the present invention;

FIG. 5 is a further vertical section taken substantially on line 5—5 of FIG. 2 that depicts the gear means supported from the head plate;

FIG. 6 is a vertical section taken substantially on line 6—6 of FIG. 2 that depicts the attaching means by which the spider and tail plate of the tail assembly may be detachably joined through cooperative interengagement with the tail cover cap.

FIG. 7 is a partial area of FIG. 4 depicting the pawl and ratchet of the antireverse mechanism interengaged; and, FIG. 8 is a view taken substantially on line 8—8 of FIG. 4 depicting the antireverse mechanism in profile.

DESCRIPTION OF THE PREFERRED EMBODIMENT

Figure 2:
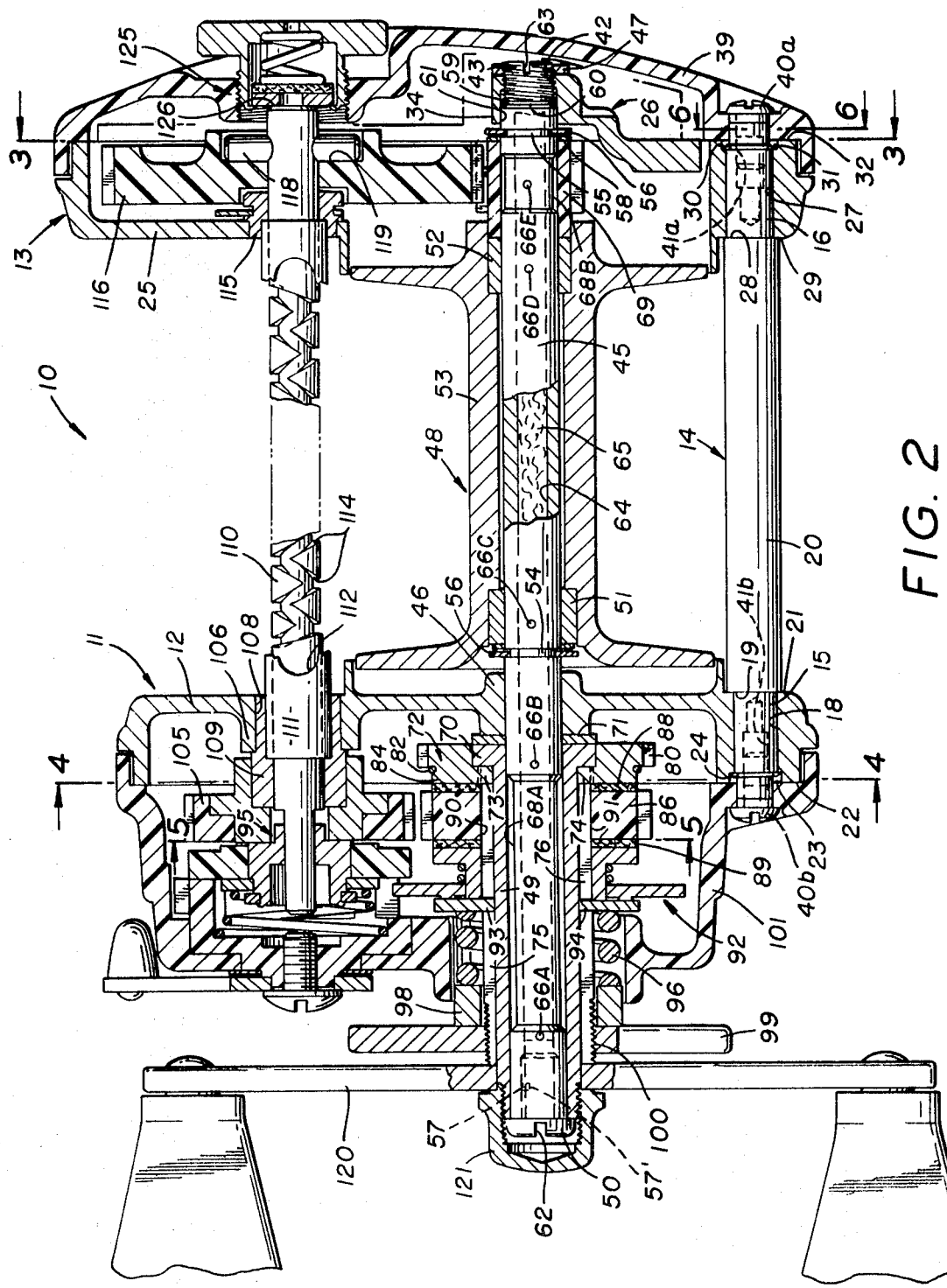
FIG. 2 is an enlarged horizontal cross section taken substantially on line 2—2 of FIG. 1.

Referring more particularly to the drawings, a reel embodying the concept of the present invention is indicated generally by the numeral 10. The frame 11 of the reel 10 comprises a head plate 12 rigidly secured in spaced relation to a tail assembly 13 by a plurality of pillars 14. As best seen in FIG. 2, each pillar has reduced end portions 15 and 16. End portion 15 is closely fitted in a receiving bore 18 through the head plate 12 with the shoulder 19, defining the transition from the body portion 20 of the pillar to the end portion 15, abutting the axially inner face 21 of the head plate 12. The axially outer face 22 of the head plate 12 presents a counterbore 23 about the opening of the bore 18, and a second shoulder 24 on the reduced end portion 15, is upset into the counterbore 23 rigidly to integrate the pillar 14 to the head plate 12. A standard mounting shoe 17 may be secured between two adjacent pillars 14.

The tail assembly 13 comprises a tail plate 25 to which a spider 26 is affixed. The tail plate 25 also has a plurality of receiving bores 27 in which the reduced end portion 16 of each pillar 14 is closely fitted. The shoulder 28, forming the transition from the end portion 16 to the body portion 20 of each pillar, abuts the axially inner face 29 of the tail plate 25, and a second shoulder 30 is upset into the counterbore 31 at the opening of bore 27 through the axially outer face 32 of the tail plate 25. The pillars 14 thus maintain the head plate 12 and the tail plate 25 in rigidly spaced relation by their integration therewith.

Figure 3:
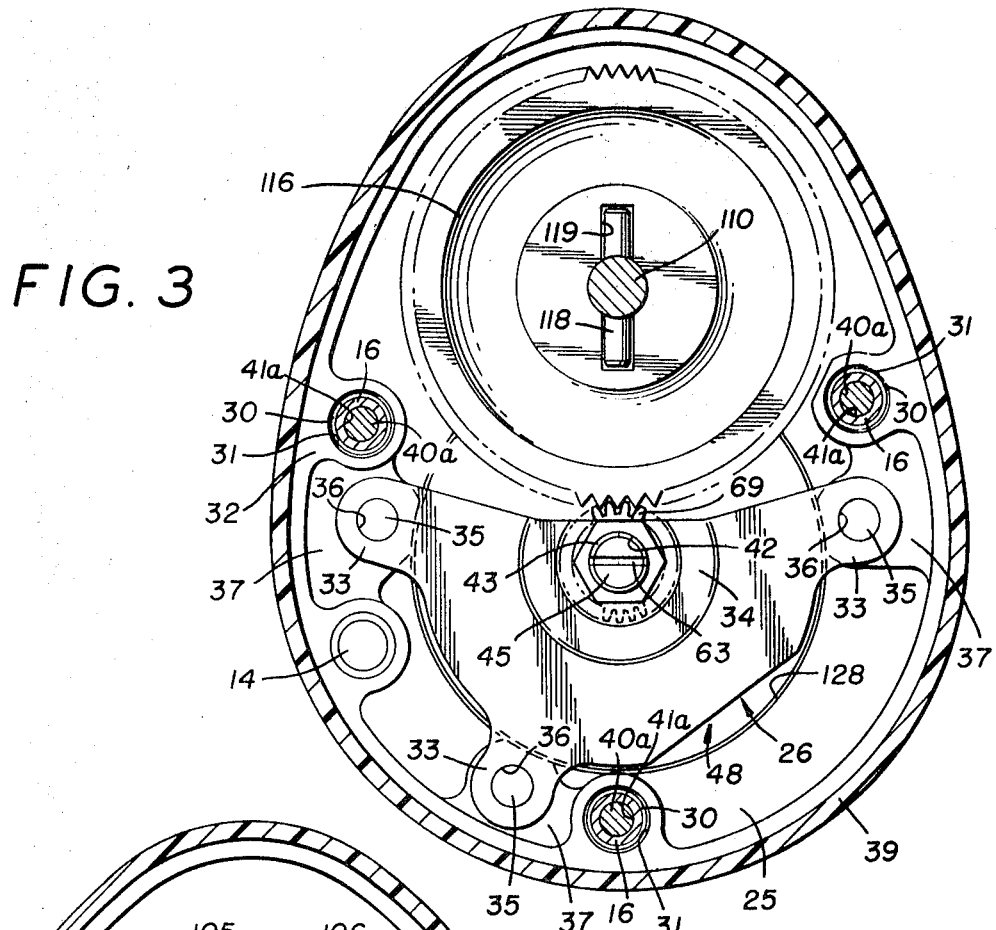
FIG. 3 is a vertical section taken substantially on line 3—3 of FIG. 2 that depicts the tail assembly in elevation.

As best seen in FIG. 3, the spider 26 has a plurality of legs 33, three as depicted, extending radially from a nave 34. Each leg 33 is detachably mounted to the tail plate 25. Although many varieties of securing means may be used, one of the most convenient utilizes a pin 35 extending axially of the tail plate 25 and closely received within a corresponding bore 36 in the radially outer extremity of each leg 33. To maintain the legs firmly mounted against a supporting shelf 37 in the tail plate 25, a plurality of bosses 38 (FIG. 6) may be presented on the interior of the tail plate cover cap 39. The cover cap 39 is, in turn, demountably attached to the frame 11 by a plurality of cap screws 40a threadably received within tapped axial bores 41a in the pillars 14.

One may, of course, maintain the integrity of the frame completely independently of the cover cap 39 by utilizing individual screws, or other attaching means, to mount each leg 33 to the tail plate 25.

The connecting means by which the arbor 45 is anchored in spider 26 is best observed from FIGS. 2 and 3. The nave 34 of spider 26 has an axial bore 42 tapped to receive the threaded end portion 43 of an arbor 45. The arbor 45 extends axially of the tail assembly 13 and pierces a boss 46 in the head plate 12 so as to become, in effect, a component of the reel frame 11 and yet be axially slidable therein.

A line spool 48 is rotatably supported on the arbor 45 between the head plate 12 and the tail assembly 13, and a drive shaft 49 is secured on that portion of the arbor 45 extending axially outwardly of the head plate 12 in a direction oppositely of the tail assembly 13. The drive shaft 49 is secured to the arbor 45 by a capscrew 50 tightened into the axially outer end of the arbor.

Rotatably to mount the line spool 48 on arbor 45, a pair of sleeve bearings 51 and 52 are press fitted within the hub 53 of the spool 48 and are rotatably journaled on the arbor 45 to permit the spool to rotate with respect thereto.

The spool 48 is positioned relative to the arbor 45 by locating means. Specifically, a pair of axially spaced peripheral grooves 54 and 55 on the arbor 45 each receive a substantially circular, spring-retaining clip 56 and an annular, low-friction thrust washer 58 juxtaposed to the sleeve bearings 51 and 52 whereby to maintain the line spool 48 in a fixed axial position with respect to the arbor 45. The axial position of the line spool 48 with respect to the reel frame 11 may be adjusted by selective rotation of the arbor 45, the threaded connection between the arbor 45 and the nave 34 of the spider 26 permitting the accomplishment of a variation in the selective axial positioning of the arbor 45, and thus the line spool 48, with respect to the head plate 12 and the tail assembly 13.

An O-ring 59 received within a peripheral groove 60 at the base of the threaded end portion 43 on arbor 45 frictionally engages the cylindrical wall 61 of a counterbore to the axial bore 42 through nave 34. The O-ring 59 comprises a binding means that tends to prevent rotation of the arbor 45 except when rotated by a screwdriver, or the like, engaged with the slot 62 in capscrew 50. A locknut 47, received on the threaded end portion 43 to engage nave 34, may also be employed to assure that arbor 45 remains selectively positioned with respect to the frame 11.

It should be understood that the screw 50 must be tightened into arbor 45 sufficiently that subsequent turning of screw 50 rotates the arbor 45 with respect to the spider 26 rather than the screw 50 with respect to the arbor 45. This result may be further enhanced by the use of binding means between the meshed threads of screw 50 and those in arbor 45. Exemplary of such binding means would be the employment of a nylon pin 57 received within a radial bore 57' in the threaded portion of screw 50 to engage those in arbor 45. Such a binding means is sold under the trademark Nylock. Another example of a suitable binding means would be the use of a liquid, such as sold under the trademark LocTite, on the meshed threads that sets to a semisolid state in order to resist, but not preclude, relative rotation between the meshed threads.

In order to permit facile loosening of the screw 50 with respect to the arbor 45, the threaded end portion 43 may be provided with a slot 63, or the like, by which the arbor 45 can be held as the screw 50 is turned. Removal of the screw 50 will be required periodically for lubrication of all the bearing surfaces along the arbor. A cavity 64 extends axially within the arbor 45 and receives a porous wick 65 that will afford a reservoir of oil, or other liquid lubricant. A plurality of orifices 66 are judiciously spaced along the arbor to provide communication between the cavity 64 and the exterior of the arbor.

In addition to the provision of lubricant through orifices 66A and 66B to reduce the friction between the drive shaft 49 and the arbor 45, frictional resistance against rotation of the drive shaft 49 may be further alleviated by reduction of the bearing surfaces therebetween. In the preferred embodiment this is accomplished by relieving a portion of the diameter of the arbor 45, as at 68A, so that the drive shaft 49 is supported only at the axial ends of the relieved portion 68A.

Orifices 66C and 66D lubricate the sleeve bearings 51 and 52, respectively, and, a fifth orifice 66E lubricates the pinion gear 69 secured to the line spool 48. The arbor 45 may also be relieved, at 68B, beneath pinion 69 to minimize the bearing surface between the pinion and arbor.

Figure 4:
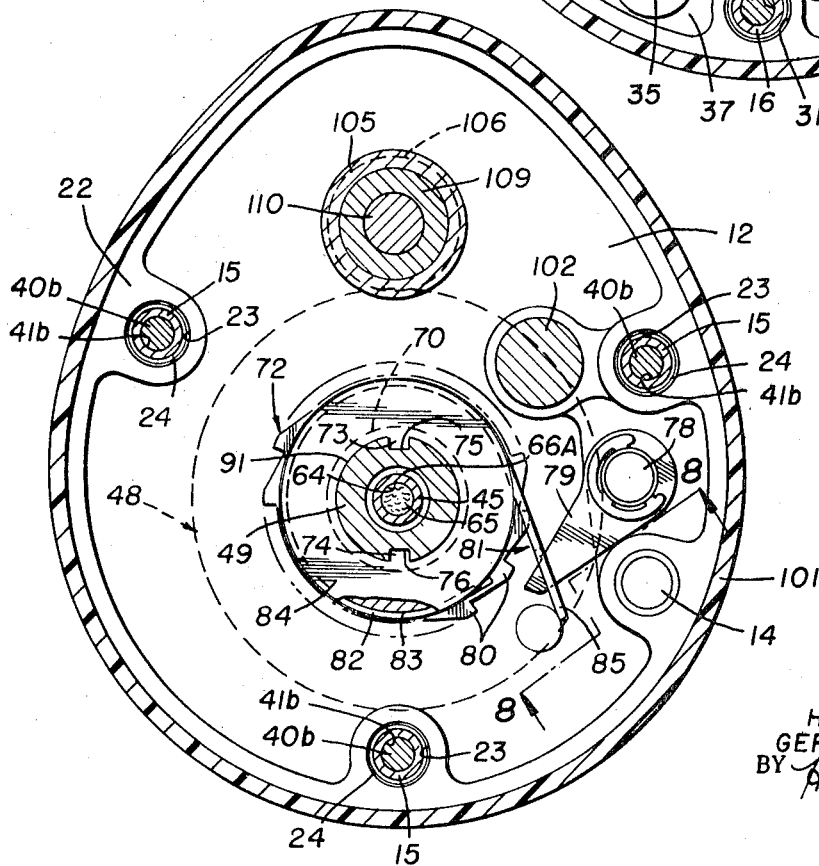
FIG. 4 is a vertical section taken substantially on line 4—4 of FIG. 2 that depicts the head plate and antireverse mechanism mounted thereon in elevation.

A radial flange 70 at the axially inner end of the drive shaft 49 engages a thrust washer 71 mounted on arbor 45 and interposed between the flange 70 and the axially outer face of boss 46. The flange 70 provides a stop against which an antireverse ratchet wheel 72 abuts. The ratchet wheel 72 is mounted on the drive shaft 49 to be nonrotatable with respect thereto. As best seen in FIG. 4, a pair of opposed keys 73 and 74 on the ratchet wheel 72 interfit with diametrically opposed ways 75 and 76 that extend axially of the drive shaft 49.

A pivot pin 78 extends axially outwardly of the head plate 12, and a pawl 79 is swingingly mounted thereon for operative engagement with the teeth 80 on the antireverse ratchet wheel 72. A bridle 81 biases the pawl 79 into engagement with the teeth 80 to prevent the drive shaft 49 from reversely rotating. A resilient, hooklike jaw 82 on one end of the bridle 81 is received within an annular groove 83 on the drum portion 84 of the ratchet wheel 72. The bridle 81 presents a hook 85 at the end opposite the jaw 82, and the hook 85 engages the pawl 79. When the drive shaft 49 rotates in opposition to the jaw 82, the hook 85 moves tangentially away from the ratchet wheel 72, permitting the pawl 79 to ride across the successive teeth 80. However, when the drive shaft 49 rotates with the jaw 82 (the direction designated by the arrow in FIG. 7), the bridle 81 tends to follow the drive shaft 49 to bias the pawl 79 into blocking engagement with the teeth 80. This actuation of the pawl 79 in response to unidirectional rotation of the drive shaft 49 provides an excellent antireverse feature to the subject reel 10.

An input drive gear 86 is supported on the drive shaft 49 between two friction washers 88 and 89. The cylindrical inner hub wall 90 of the drive gear 86 is slidable on the cylindrical outer wall 91 of the drive shaft 49 so that the drive gear will be both rotatable and axially slidable with respect to the drive shaft 49 to effect a selective drag, as is more fully hereinafter described.

Continuing axially outwardly along the drive shaft 49, a trip means 92 for the free spooling mechanism is juxtaposed against a friction washer 89. The trip means 92 is also provided with opposed keys 93 and 94 which interfit with the axial ways 75 and 76 so that the trip means can rotate with, but not with respect to, the drive shaft 49 and at the same time be slidable axially therealong. The operation of the trip means 92 and the clutch means 95 with which it interacts is explained in detail in our copending application, Ser. No. 835,639, filed June 23, 1969, and reference thereto may be had for a more complete disclosure with respect to this accessory for the subject reel 10.

One end of a helical compression spring 96 that encircles the drive shaft 49 engages the trip means 92 and the opposite end is engaged by an annular gland 98 that is movable axially against the spring 96, as by a star wheel 99 received on the threaded portion 100 of drive shaft 49 presented exteriorly of the head cover cap 101. The cover cap is attached to the frame 11 by a plurality of capscrews 40b threadably received within tapped axial bores 41b in pillars 14.

Adjustment of the drag is accomplished by rotation of the star wheel 99 with respect to the drive shaft 49. To increase the drag the star wheel 99 is turned to move the gland 98 axially inwardly against the spring 96. The spring 96 applies a yielding, axial force against those components stacked along the drive shaft 49 axially inwardly of the spring 96. The flange 70 defines the axially innermost extent to which those components can be moved so that as the gland applies more and more force against spring 96, it, in turn, compresses the drive gear 86 between the ratchet wheel 72 and the trip means 92. Variation of this compressive loading varies the frictional engagement between the washers 88 and 89 and the drive gear 86 embraced thereby for adjustment of the drag.

Reverting now to FIGS. 4 and 5, a flanged stub shaft 102 is secured within, and extends axially outwardly of, the head plate 12, and an idler gear 103 is rotatably supported thereon. The idler gear 103 meshes with the drive gear 86 and a receiving gear 105 also rotatably mounted from the head plate 12. Specifically, the head plate 12 presents a boss 106 (FIG. 2) radially spaced from the drive shaft 49, and has an opening 108 axially therethrough in which a bearing 109 is mounted. A traversing shaft 110, which extends between the head plate 12 and the tail assembly 13, is journaled through bearing 109 in the head plate 12. A clutch means 95 may be provided selectively to interconnect the receiving gear 105 to the traversing shaft 110, and the particular clutch means 95 depicted in FIG. 2 is described in complete detail in our aforesaid copending application, Ser. No. 835,639.

For those reels in which a level wind is not to be employed, the traversing shaft 110 may be a simple shaft encased with a tubular guard, not shown, fixed between the head plate 12 and the tail assembly 13. However, when a level wind is desired, the guard, or, in that case, a slide mount, 111 is provided with an opening 112 (FIGS. 1 and 2) which extends concentrically along the traversing shaft 110 that is also fixed between the head plate 12 and the tail assembly 13. The reciprocating level wind 113 is conventionally mounted to slide back and forth along the guard 111. A pawl (not shown) in the level wind 113 meshingly engages the crossover threads 114, provided on the traversing shaft 110, through opening 112 so that the level wind 113 will reciprocate upon rotation of the traversing shaft 110.

The traversing shaft 110 is also journaled in a bearing 115 affixed to the tail plate 25. The shaft 110 extends through bearing 115 and has a transfer gear 116 secured thereto within the tail assembly 13. As shown in FIGS. 2 and 3, a pin 118 extends transversely through the traversing shaft 110 and is received in a corresponding slot 119 of the hub portion of the transfer gear 116 so that the gear 116 will always rotate with the traversing shaft 110.

The transfer gear 116 continuously meshes with the pinion gear 69 affixed to the line spool 48 so that rotation of the line spool 48 will always be accompanied by rotation of traversing shaft 110 and thereby a corresponding translation of the level wind 113 therealong.

To rotate the line spool 48 for retrieving line the fisherman rotates the crank 120 demountably secured to the axially outer portion of the drive shaft 49. The crank 120, may be keyed, or otherwise secured, to the drive shaft 49 for rotation therewith and retained thereon by a decorative end cap 121.

So long as the resistance offered to the line, as by the fighting fish, does not exceed the frictional drag by which the drive gear 86 is caused to rotate with the drive shaft 49, as adjusted by selective manipulation of star wheel 99, the drive train—drive shaft 49, input drive gear 86, idler gear 103, receiving gear 105, traversing shaft 110, transfer gear 116 and pinion gear 69—will effect multiple revolutions of the line spool 48 in response to rotation of the crank 120. It should be appreciated that the idler gear 103 is used solely to coordinate the direction in which the line spool 48 revolves in response to the direction in which the crank 120 is rotated. It may therefore, be positioned at any point within the drive train. Selection of its location may be determined by convenience, by space requirements, by the gearing necessary to provide the desired retrieve ratio and/or by the number of gear members one is willing to have rotate during free spooling. In fact, in some reels embodying the concept of the present invention the idler gear may even be eliminated. Exemplary of this would be a reel adapted to be mounted under the rod with the line feeding onto that side of the spool remote from the rod.

For casting, the fisherman actuates the free-spooling mechanism. In the embodiment depicted the clutch means 95 selectively disengages the receiving, or clutch, gear 105 from the traversing shaft 110. As such, when the clutch means 95 is disengaged, rotation of the line spool 48 requires only concomitant rotation of the traversing shaft—and thus operation of the level wind 113—through the office of the continuously meshed transfer and pinion gears 116 and 69, respectively.

Fully to appreciate how a reel constructed according to the concept of the present invention augments the use of a free-spooling mechanism, one need only advert to the principle of bait casting. In bait casting it is the motion of the lure, as imparted by the action of the rod, that pulls the line from the reel, causing the spool on which the line is stored to revolve. The spool must begin to revolve suddenly from a dead stop at the beginning of the cast, must pay out line in ratio to the pull of the lure as it travels through the air and must be made to cease revolving as soon as the lure reaches its destination. As such, the greater the mass which must be put into motion by the cast, the greater the resistance that is offered against the flight of the lure. Similarly, once this mass is put into motion, the more difficult it is to slow the movement thereof with the flight of the lure at the end of the cast. Free-spooling mechanisms are employed to reduce the mass that must be put in motion and then be stopped.

Although it is feasible to locate the free-spooling mechanism so as to disengage the level wind as well, it is far more desirable for the level wind 113 to traverse in response to rotation of the line spool 48 in order to preclude the frictional resistance against the existing line that would result if the line were drawn from the rotating spool on which the line had been level wound through a stationary level wind 113 in proximity to the spool.

However, with a reel embodying the present concept the mass required to be put in motion and then stopped is far less than with prior known reels employing level wind mechanisms and certainly more comparable to that mass required to be rotated in a free-spooling reel not provided with a level wind. This result is partially the consequence of having the spool rotatably mounted on an arbor 45 rather than having a rotatable shaft affixed to the spool. Achievement of this reduction in mass is further enhanced by having the traversing shaft 110 included directly within the drive train so that additional coordinating mechanism is not required to interconnect the line spool 48 with the level wind mechanism, as in many known prior art constructions.

Turning now to a further aspect of a bait-casting reel embodying the present concept, one must appreciate that the angler's thumb is primarily responsible for controlling the rotation of the line spool 48 during the cast. It holds the spool firmly during the backcast, releases it at the proper point during the forward cast, slows the spool in coordination with the slowing of the lure during the latter portion of its trajectory and stops the spool when it reaches its destination. This requires great skill that can only be acquired, and maintained, by constant practice. Antibacklash mechanisms are intended to assist the angler's thumb so that the spool will not rotate faster than the rate at which the line is unwinding and thus preclude the fisherman's anathema—the backlash.

Even though the line spool 48 is itself rotatable on a relatively fixed arbor 45, the truly functional antibacklash mechanism, or brake means, 125 of the type fully disclosed in U.S. Pat. No. 3,367,598 may still be readily incorporated herein. The antibacklash mechanism 125 is mounted in the tail cover cap 39 for operative engagement with the transverse end surface 126 of the traversing shaft 110. Because the traversing shaft 110 is continuously engaged with the line spool 48 through gears 96 and 116 in the preferred embodiment, the application of the braking friction to the traversing shaft 110 effects the same result as if it were applied to a spool shaft. However, it must be appreciated that to reciprocate the level wind 113 at a reasonable speed, the traversing shaft 110 generally rotates at only a fraction of the speed at which the line spool rotates. In view of this disparity, the brake mechanism disclosed in U.S. Pat. No. 3,367,598, and its exceptional sensitivity to changes in rotational speeds, is particularly suitable for the installation disclosed.

Finally, a reel embodying the present concept permits facile interchange of the line spool, an accomplishment that requires a major disassembly with most prior known reels and heretofore impossible with any bait-casting reel having an integral frame. Yet such a feature is highly desirable because it permits the line to be changed, as from one test to another, without stripping all the line from the reel and then rewinding the replacement line.

To change line spools it is preferred that the crank 120 be turned until the level wind 113 is brought into proximity with the head plate 12. This facilitates the manipulation of the traversing shaft 110 required to change spools. The tail cover 39 is then removed by unscrewing the three small capscrews 40. After the cover 39 is removed the transfer gear 116 may be removed from the traversing shaft 110, or, as is equally feasible, the transfer gear 116 and shaft 110 may be removed as a unit. The arbor 45 is then unthreaded from the nave 34 of spider 26 and the spider 26 lifted off the positioning pins 35 in the tail plate 25. Thereafter, removal of the spring clip 56, from groove 55, and the thrust washer 58 permits line spool 48 to be slid axially off the arbor 45 and outwardly through the cylindrical access 128 provided for this purpose in tail plate 25. A new line spool is then installed by reversing this procedure, and the reel is ready for the next cast. In order to permit this facile interchanging of the spool, the pins 35, or any other attaching means for mounting the radial legs 33 of spider 26 to the tail plate 25, must be located radially outwardly of the cylindrical access 128.

It should now be readily apparent that a bait-casting reel embodying the concept of the present invention provides a marked improvement over prior known bait-casting reels and otherwise accomplishes the objects of the invention.

We claim:

1. A fishing reel comprising, a head plate, a tail assembly rigidly secured in spaced relation to said head plate, an arbor extending between said head plate and said tail assembly, a line spool rotatably mounted on said arbor, a traversing shaft journaled in and extending between said head plate and said tail assembly in spaced relation with said line spool, crank means rotatably mounted on said head assembly, said crank means first means operatively connecting said crank means to said traversing shaft, and second means independent of said first means operatively connecting said traversing shaft to said line spool.

2. A fishing reel, as set forth in claim 1, in which said first means including a first gear means operatively joining said traversing shaft to said crank means, means rotatably supporting said first gear means from said head plate, and said second means including a second gear means operatively joining said traversing shaft to said line spool, said second gear means being rotatably supported within said tail assembly.

3. A fishing reel, as set forth in claim 2, in which the second gear means comprises a transfer gear secured on said traversing shaft to rotate therewith and a pinion gear secured to said line spool to rotate therewith, said transfer and pinion gears being meshingly engaged.

4. A fishing reel, as set forth in claim 3, in which means are provided detachably to secure said transfer gear to said traversing shaft.

5. A fishing reel comprising, a head plate, a tail assembly rigidly secured in spaced relation to said head plate, said tail assembly including a tail plate with a spider demountably anchored thereto, an arbor having opposed end portion, securing means releasably connecting one end portion of said arbor to said spider, the other end portion of said arbor extending through said head plate, a line spool rotatably mounted on said arbor between the head plate and the tail assembly, a drive shaft rotatably mounted on the portion of said arbor extending beyond said head plate, crank means selectively to rotate said drive shaft, a drive train operatively connected between said drive shaft and said line spool to revolve the latter in response to rotation of the former, and a cylindrical access axially through said tail plate to permit the line spool selectively to slide on and off said arbor.

6. A reel, as set forth in claim 5, having a traversing shaft in spaced relation with said line spool, said traversing shaft journaled in and extending between said head plate and tail assembly, said traversing shaft being included in said drive train.

7. A reel, as set forth in claim 6, in which a brake means provides selective resistance to the rotation of said traversing shaft.

8. A fishing reel, as set forth in claim 6, in which first gear means operatively join said traversing shaft to said drive shaft, said first gear means rotatably supported from said head plate, and in which second gear means operatively join said traversing shaft to said line spool within said tail assembly.

9. A fishing reel, as set forth in claim 8, in which clutch means provide a selective connection between said first gear means and said traversing shaft.

10. A fishing reel, as set forth in claim 4, in which said tail assembly comprises, a tail plate and a spider detachably secured to said tail plate, said traversing shaft being rotatably journaled in said tail plate, said arbor being supported from said spider.

11. A fishing reel, as set forth in claim 10, in which an access is provided axially through said tail plate to permit selective removal of the line spool therethrough when said spider is detached from said tail plate.

12. A fishing reel, as set forth in claim 11, in which removable locating means retain the line spool in fixed axial relation with respect to said arbor, an adjustable interengagement between said arbor and said head assembly and between said arbor and said spider to permit said line spool to be selectively positionable axially of said head plate and tail assembly.